US008923392B2

(12) United States Patent
Bourdev et al.

(10) Patent No.: US 8,923,392 B2
(45) Date of Patent: Dec. 30, 2014

(54) METHODS AND APPARATUS FOR FACE FITTING AND EDITING APPLICATIONS

(75) Inventors: Lubomir D. Bourdev, San Jose, CA (US); Elya Shechtman, Seattle, WA (US); Jue Wang, Kenmore, WA (US); Fei Yang, Highland Park, NJ (US)

(73) Assignee: Adobe Systems Incorporated, San Jose, CA (US)

( * ) Notice: Subject to any disclaimer, the term of this patent is extended or adjusted under 35 U.S.C. 154(b) by 484 days.

(21) Appl. No.: 13/408,873

(22) Filed: Feb. 29, 2012

(65) Prior Publication Data

US 2013/0121409 A1    May 16, 2013

Related U.S. Application Data

(60) Provisional application No. 61/533,102, filed on Sep. 9, 2011.

(51) Int. Cl.
*H04N 7/26* (2006.01)
*G06T 9/00* (2006.01)
*G06K 9/00* (2006.01)
*G06K 9/46* (2006.01)
*G06K 9/62* (2006.01)

(52) U.S. Cl.
CPC ............ *G06T 9/001* (2013.01); *G06K 9/00208* (2013.01); *G06K 9/00288* (2013.01); *G06K 9/4671* (2013.01); *G06K 9/6228* (2013.01); *G06K 9/00302* (2013.01)
USPC .................................................. 375/240.08

(58) Field of Classification Search
CPC .................................................. G06K 9/00302
USPC .................................................. 375/240.08
See application file for complete search history.

(56) References Cited

U.S. PATENT DOCUMENTS

| | | |
|---|---|---|
| 5,963,247 A | 10/1999 | Banitt |
| 6,297,825 B1 | 10/2001 | Madden et al. |
| 6,504,546 B1 | 1/2003 | Cosatto et al. |
| 6,532,036 B1 | 3/2003 | Peleg et al. |
| 6,556,196 B1 | 4/2003 | Blanz et al. |
| 7,006,124 B2 | 2/2006 | Peleg et al. |
| 7,050,655 B2 | 5/2006 | Ho et al. |
| 7,142,723 B2 | 11/2006 | Kang et al. |
| 7,697,787 B2 | 4/2010 | Illsley |
| 8,027,531 B2 | 9/2011 | Wilburn et al. |

(Continued)

OTHER PUBLICATIONS

Telea, A., Jalba, A.: Voxel-Based Assessment of Printability of 3D, In proceedings of ISMM 2011, Springer, 2011 May 29, 2012, pp. 1-12.

(Continued)

*Primary Examiner* — Christopher S Kelley
*Assistant Examiner* — Jonathan Messmore
(74) *Attorney, Agent, or Firm* — Wolfe-SBMC

(57) ABSTRACT

Various embodiments of methods and apparatus for face fitting are disclosed. In one embodiment, sets of two-dimensional local feature points on a face in each image of a set of images are identified. The set of images includes a sequence of frames a video stream. A three-dimensional face model for the face in the each image is generated as a combination of a set of predefined three-dimensional face models. In some embodiments, the generating includes reducing an error between a projection of vertices of the set of predefined three-dimensional face models and the two-dimensional local feature points of the each image, and constraining facial expression of the three-dimensional face model to change smoothly from image to image in the sequence of video frames.

20 Claims, 15 Drawing Sheets

(56) References Cited

U.S. PATENT DOCUMENTS

| | | |
|---|---|---|
| 8,340,349 B2 | 12/2012 | Salgian et al. |
| 8,564,657 B2 | 10/2013 | Michalke et al. |
| 8,624,901 B2 | 1/2014 | Park et al. |
| 8,818,131 B2 | 8/2014 | Wang et al. |
| 2003/0007700 A1 | 1/2003 | Gutta et al. |
| 2006/0204040 A1 | 9/2006 | Freeman et al. |
| 2006/0257042 A1 | 11/2006 | Ofek et al. |
| 2007/0091085 A1 | 4/2007 | Wang et al. |
| 2007/0189584 A1 | 8/2007 | Li |
| 2007/0189627 A1 | 8/2007 | Cohen et al. |
| 2007/0237421 A1 | 10/2007 | Luo et al. |
| 2008/0219652 A1 | 9/2008 | Pitkin et al. |
| 2009/0052532 A1 | 2/2009 | Robinson |
| 2010/0165206 A1 | 7/2010 | Nestares et al. |
| 2010/0214290 A1 | 8/2010 | Shiell et al. |
| 2011/0091131 A1 | 4/2011 | Price et al. |
| 2011/0298799 A1 | 12/2011 | Mariani et al. |
| 2013/0129141 A1 | 5/2013 | Wang et al. |

OTHER PUBLICATIONS

"Non-Final Office Action", U.S. Appl. No. 12/954,487, (Feb. 4, 2013),14 pages.

"Non-Final Office Action", U.S. Appl. No. 12/955,071, (Oct. 18, 2012),11 pages.

Agarwala, et al., "Interactive digital photomontage", *ACM Transactions on Graphics (Proc. SIGGRAPH)*, 23(3), 294-302, 2004, 9 pages.

Baker, et al., "Lucas-Kanade 20 Years On: A Unifying Framework", *International Journal of Computer Vision*. 56(3), pp. 221-255, 2004., 35 pages.

Basu, et al., "Motion Regularization for Model-Based Head Tracking", *Proceedings of ICPR*(Aug. 1996), pp. 611-616.

Blanz, et al., "Exhanging Faces in Images", *Proc. of Eurographics*, vol. 23, pp. 669-676, 2004., 8 pages.

Blanz, Volker "A Learning-Based High-Level Human Computer Interface for Face Modeling and Animation", *Proceedings of the ICMI 2006 and IJCAI 2007 International Conference of Artificial Intelligence for Human Computing*, pp. 296-315, 2007., 20 pages.

Cheng, et al., "3D-Model-based Face Replacement in Video", *SIGGRAPH '09: Posters*, p. 29:1, New York, NY, USA, 2009., 1 page.

Cootes, et al., "Active Apperance Models", *IEEE Transactions on Pattern Analysis and Machine Intelligence*, 23(6):681-685, 2001 pp. 1-5, (Jun. 2001), 5 pages.

Cootes, et al., "Active Shape Models—Their Training and Application", vol. 61, No. 1, January, pp. 38-59, 1995 pp. 1-12, 12 pages.

DeCarlo, et al., "The Integration of Optical Flow and Deformable Models with Applications to Human Face Shape and Motion Estimation", *IEEE Computer Society Conference*, (Jun. 1996), 15 pages.

Derutin, et al., "SIMD, SMP and MIMD-DM parallel approaches for real-time 2D image stabilization", *Proceedings of the Seventh International Workshop on Computer Architecture for Machine Perception*, (Jul. 2005), 8 pages.

Everingham, et al., ""Hello! My name is . . . Buffy"—Automatic Naming of Characters in TV Video", *Proc. British Machine Vision Conference (BMVC)*, 2006 pp. 1-10, 10 pages.

Felzenszwalb, et al., "Pictorial Structures for Object Recognition", *International Journal of Computer Vision*, vol. 61, No. 1, pp. 55-79, Jan. 2005, pp. 1-42, 42 pages.

Gu, et al., "A Generative Shape Regularization Model for Robust Face Alignment", *Proceedings of the 1oth European Conference on Computer Vision*, Marseille, France, 2008. pp. 1-14, 14 pages.

Joshi, et al., "Personal Photo Enhancement Using Example Images", *ACM Trans. Graph.*, vol. 29, No. 2. 2010, pp. 1-15., 15 pages.

Lee, et al., "Estimation of 3D Faces and Illumination from Single Photographs Using A Bilinear Illumination Model", *Proceedings Rendering Techniques 2005: Eurographics symposium on rendering*: Konstanz, Germany, Jun. 29-Jul. 1, 2005.,10 pages.

Li, et al., "3-D Motion Estimation in Model-Based Facial Image Coding", *Pattern Analysis and Machine Intelligence*, IEEE Transactions on 15.6, (Jun. 1993), pp. 545-555.

Milborrow, et al., "Locating Facial Features with an Extended Active Shape Model", *Proceedings of the 10th European Conference on Computer Vision*, 504-513, 2008. pp. 1-11, 11 pages.

Perez, et al., "Poisson Image Editing", *ACM Trans. Graph.*, vol. 22, (Jul. 2003), pp. 313-318.

Song, "A Generic Framework for Efficient 2-D and 3-D Facial Expression Analogy", *IEEE Transactions on Multimedia*, vol. 9, No. 7, Nov. 2007., 12 pages.

Viola, et al., "Rapid Object Detection using a Boosted Cascade of Simple Features", *Proc. Computer Vision and Patten Recognition*, pp. 511-518, 2001., 9 pages.

Vogler, et al., "The Best of Both Worlds: Combininb 3D Deformable Models with Active Shape Models", *Inl'l Conf. Computer Vision (ICCV)*, 2007. pp. 1-7, 7 pages.

Wen, et al., "Face Relighting with Radiance Environmnet Maps", *Proceedings of the 2003 IEEE Computer Society Conference on Computer Vision and Pattern Recognition (CVPR'03)*, 2003., 8 pages.

Yang, et al., "Expression Flow for 3D-Aware Face Component Transfer", *ACM Trans. Graph.* 30, 4, Article 60, Jul. 2011., 10 pages.

Zhang, et al., "Spacetime Faces: High Resolution Capture for Modeling and Animation", *ACM SIGGRAPH Proceedings*, Los Angeles, CA, Aug. 2004. pp. 1-11, 11 pages.

"Notice of Allowance", U.S. Appl. No. 12/954,487, May 6, 2014, 7 pages.

"Final Office Action", U.S. Appl. No. 12/954,487, (Jun. 26, 2013),18 pages.

Beymer, David J., "Face Recognition Under Varying Pose", *IEEE*, (1994), pp. 756-761.

Theobalt, Christian et al., "Combining 3D Flow Fields with Silhouette-based Human Motion Capture for Immersive Video", *Graphical Models* 66(2004), pp. 333-351.

METHODS AND APPARATUS FOR FACE FITTING AND EDITING APPLICATIONS

This application claims benefit of priority to U.S. Provisional Application Ser. No. 61/533,102, which was filed on Sep. 9, 2011, the content of which is incorporated herein by reference in its entirety.

BACKGROUND

Description of the Related Art

The recent profusion of inexpensive digital motion picture cameras has enabled the creation of a much broader universe of digital video content. New market entrants are now able to bring video capture to environments and events for which such video capture was previously considered cost prohibitive or technically unfeasible. In the past few decades, video cameras have become smaller and more robust, and therefore portable to environments where videography was previously considered to be extremely difficult due to either the harshness of the environment or the inconvenience of introducing the video camera equipment form factor into the space where the video camera was desired.

Modern digital video cameras are also able to capture more images to smaller media and remain in service for a greater number of minutes, thereby increasing the desirability of a video camera in situations where video cameras were previously not worth the inconvenience. Further, advances in the material design of video camera cases have created a generation of video cameras that may be used in harsh environments, such as extreme temperature or exposure to moisture.

Many applications of video invariably result in the capture of moving images of a single human face or one or more human faces.

SUMMARY

Various embodiments of methods and apparatus for face fitting are disclosed. In one embodiment, sets of two-dimensional local feature points on a face in each image of a set of images are identified. The set of images includes a sequence of frames a video stream. A three-dimensional face model for the face in the each image is generated as a combination of a set of predefined three-dimensional face models. In some embodiments, the generating includes reducing an error between a projection of vertices of the set of predefined three-dimensional face models and the two-dimensional local feature points of the each image, and constraining facial expression of the three-dimensional face model to change smoothly from image to image in the sequence of video frames.

Figure 1:
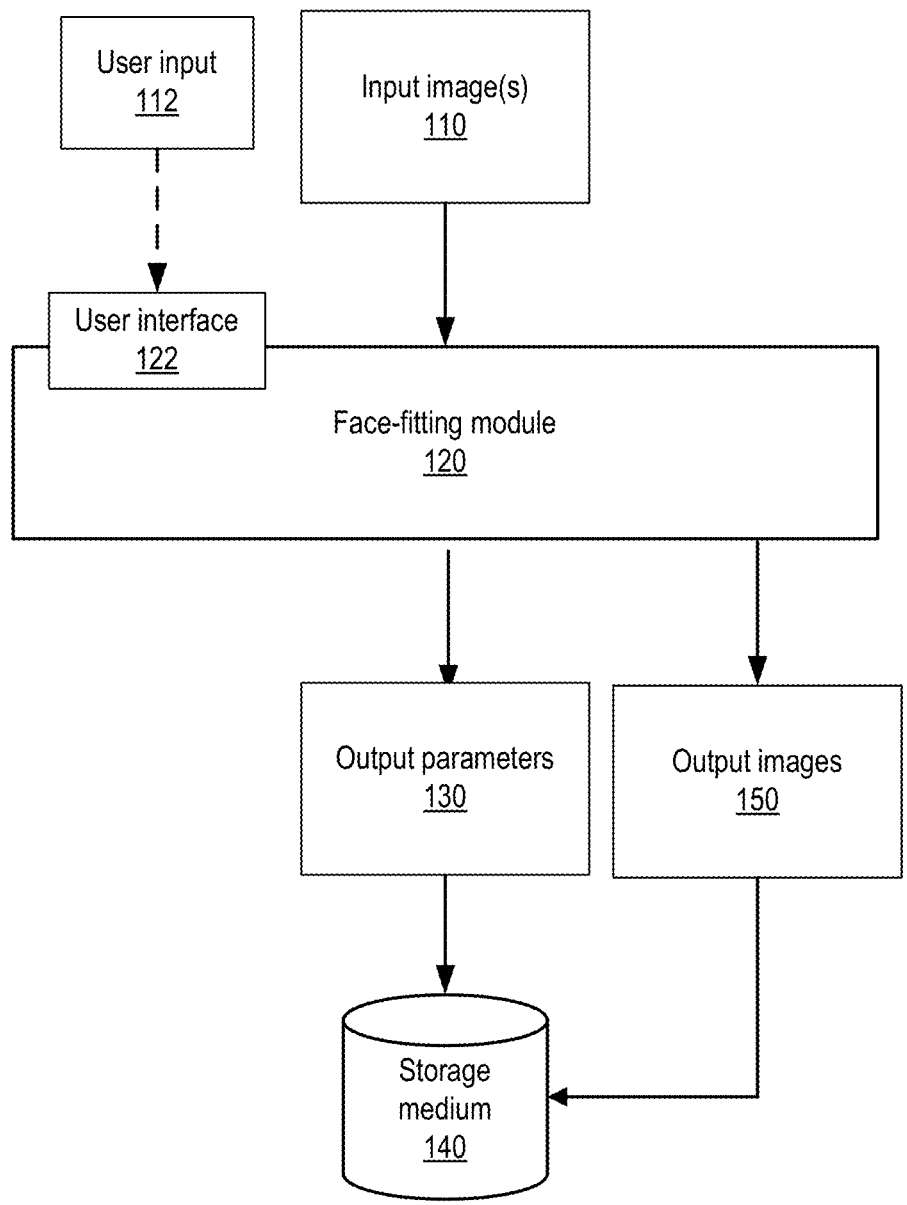
FIG. 1 illustrates a module that may implement face fitting and editing applications, according to some embodiments.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for face-fitting in video streams and applications of face fitting in video streams are disclosed. Some embodiments may include a means for identifying sets of two-dimensional local feature points on a face in each image of a set of images, and generating a three-dimensional face model for the face in the each image as a combination of a set of predefined three-dimensional face models. In some embodiments, the generating reduces an error between a projection of vertices of the set of predefined three-dimensional face models and the two-dimensional local feature points of the each image and constrains facial expression of the three-dimensional face model to change smoothly from image to image in the sequence of video frames. For example, the set of images may include a sequence of frames a video stream. Some embodiments perform applications of the face-fitting algorithm described herein including expression correction, frame replacement, and compression, among others.

The face-fitting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform identifying sets of two-dimensional local feature points on a face in each image of a set of images, and generating a three-dimensional face model for the face in the each image as a combination of a set of predefined three-dimensional face models, as described herein. Other embodiments of the face fitting module may be at least partially implemented by hardware circuitry and/or firmware stored, for example, in a non-volatile memory.

Some embodiments fit three-dimensional face models from a predefined dataset to a set of images, such as, for example, a video of a person not in the dataset. Some embodiments model the face geometry of each input image using a 3-mode tensor that relates facial landmarks to expression and identity variations in a low-dimension subspace. In some such embodiments, frames are fitted simultaneously under the constraints that all images have the same identity, and the face expressions change smoothly. Some embodiments implement applications for expression editing, enhancement and transfer in video. An example embodiment, which is described in detail, and which one of skill in the art will realize in light of having read the present disclosure is by no means limiting, is usable to remove a few frames with an undesired expression and fill them using the techniques described herein.

Some embodiments exploit the similar geometrical structures common in human faces. Some embodiments exploit the observation that the differences between faces shapes result primarily from two causes: identity and expression. For more robust face fitting, embodiments decouple these two factors from each other (see FIG. 3). Embodiments employ tensor models to face modeling to enhance decoupling.

Some embodiments employ a face fitting algorithm, described below, which jointly fits three-dimensional face models to an image sequence. Some embodiments model the face geometry using a 3-mode tensor model, which deforms in a low-dimension tensor space. Under the constraints that all images have the same person, and the face expressions must change smoothly, some embodiments jointly fit all frames at the same time.

Some embodiments exploit a joint fitting approach to fit an image sequence, using a fitting algorithm that decouples the face shape from its expression and identity. Some embodiments calculate face fitting as an energy minimization problem, with some embodiments using an iterative algorithm to solve the energy minimization by gradually reducing the total energy for accelerated convergence. An example embodiment applies the proposed method to a hole-filing problem for recovery of a face shape in missing frames. Additional embodiments are briefly discussed, with applications such as compression and expression adjustment.

Figure 4:
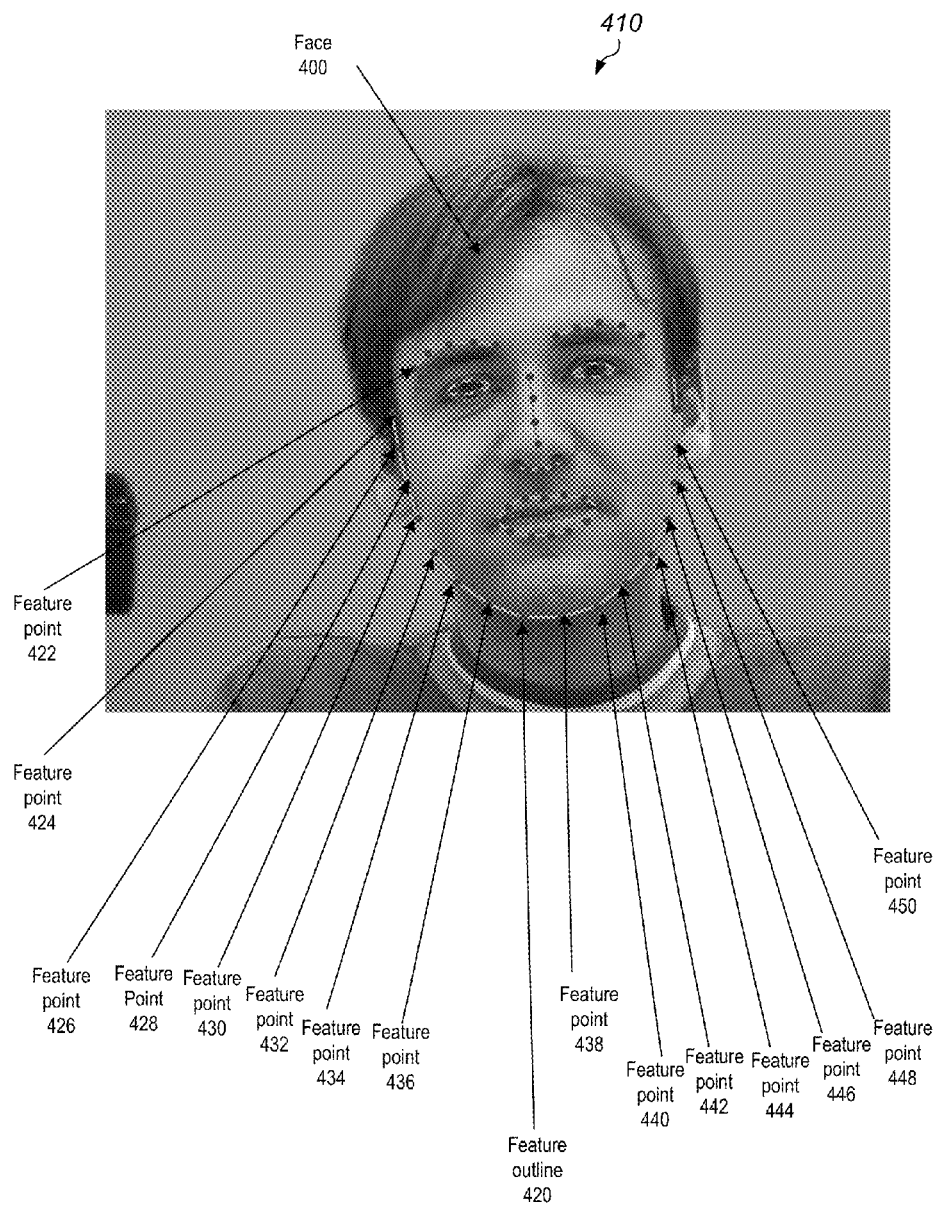
FIG. 4 illustrates identification of feature points for use in face fitting and editing applications according to some embodiments.

As shown in FIG. 4, embodiments employ a facial feature tracking system to automatically detect and track sixty-six predefined landmarks on a face. Some of these landmarks are defined at specific locations (e.g. eye corner, nose-tip etc). Others are defined to interpolate the boundary of face components (e.g., a mouth boundary is defined by 12 landmarks in some embodiments). For landmarks located inside the face, some embodiments simply hard-code the corresponding three-dimensional vertex. However, landmarks along the face contour do not have a single corresponding vertex and are matched with three-dimensional vertices along the face silhouette. Some embodiments employ a two-stage optimization approach. In the first stage, such embodiments find the correspondences between vertices and landmarks by projecting the vertices onto the image plane, finding the boundary and assigning each landmark to the closest point on the boundary. In the second stage, such embodiments deform the face shape to fit three-dimensional vertices to landmarks. Some embodiments repeat the two stages until the shape converges.

Some embodiments employ a tensor decomposition model, in which the face shape at frame t is defined by $s_t = \bar{s} + V \otimes \beta_t \otimes \gamma$ and where $\bar{s}$ is the mean shape; $V$ is tensor mode; $\beta_t$ is the expression coefficient (or vector of coefficients) at frame t; and $\gamma$ is the identity coefficient (or vector of coefficients). In some embodiments, the three-dimensional fitting is performed by varying the coefficients $\beta_t$ and $\gamma$ in order to minimize the error between the projections of the pre-defined three-dimensional vertices and the two-dimensional feature points. Given that face shapes are in a low dimensional tensor space, and the facial expression changes smoothly, some embodiments employ the energy function, $E = E_{fid} \lambda_1 \cdot E_\gamma + \lambda_2 \cdot E_\beta + E_{temp}$.

In some embodiments, the fidelity term $E_{fid}$ is defined as the sum of square error between the projections of the pre-defined landmarks on the three-dimensional face geometry and the two-dimensional feature points, $$E_{fid} = \frac{1}{2}\sum_t \left\| w^{\frac{1}{2}}(P_t s_t - X) \right\|^2,$$

where X contains the locations of two-dimensional face features. Some embodiments apply a weak perspective projection model, thus the projection matrix $P_t$ can be defined as $P_t = F(I_n \odot R_t)$ Where $R_t$ is 2 by 3 matrix which rotates a three-dimensional vertex and project to 2D image plane, $I_n$ is a n-by-n identity matrix and $\odot$ is the Kronecker product. The Kronecker product is an operation on two matrices of arbitrary size resulting in a block matrix. It gives the matrix of the tensor product with respect to a standard choice of basis. F is a 2K-by-2n selection matrix to select K landmarks from all n vertices. In some embodiments, each row of F defines exactly one element to be 1, and all others to be 0. W is a 2K by 2K positive diagonal matrix, which controls the weights of landmarks.

In some embodiments, the subspace energy term is defined from the intuition that the coefficient vector of a new sample is close to the distribution of those of the training samples. The subspace energy term for identity coefficient $\gamma$ and expression coefficient $\beta_t$ are defined in some embodiments as $$E_\gamma = \frac{1}{2} \gamma^T \gamma$$

and $$E_\beta = \frac{1}{2} \sum_t \beta_t^T \beta_t.$$

Using the assumption that the facial expression changes smoothly in time, some embodiments define the temporal coherence energy term as the square of the $1^{st}$ and $2^{nd}$ order derivatives of $\beta_t$, $$E_{temp} = \frac{1}{2} \sum_t \left( \lambda_3 \cdot \|\nabla_t \beta_t\|^2 + \lambda_4 \cdot \|\nabla_t^2 \beta_t\|^2 \right).$$

In some embodiments, the total energy function is minimized with respect to projection matrices $R_t$, expression coefficients $\beta_t$ and identity coefficient $\gamma$. Note that, in some embodiments, $R_t$ and $\beta_t$ have different values in each frame, but $\gamma$ is always the same. Some embodiments apply alternative coordinate descent algorithms, and iteratively optimize $R_t$, $\beta_t$ and $\gamma$. One such algorithm is summarized as:

Initialize $\beta_t$ and $\gamma$
Loop
    Optimize $R_t$, t=1, . . . , T
    Optimize $\beta_t$, t=1, . . . , T
    Optimize $\gamma$
Until converge To minimize total energy with respect to $\gamma$, embodiments set the gradient of E to $\gamma$ to be zero, such that $$0 = \frac{\partial E}{\partial \gamma} \sum_t M_t^T W(P_t \bar{s} + M_t \gamma - X_t) + \lambda_1 \gamma,$$

in which $M_t = P_t V \otimes \beta_t$. Some embodiments are based on a solution to the above equation such that $\gamma = \mathcal{A}^{-1} \mathcal{B}$, in which $$\mathcal{A} = \sum_t \mathcal{A}_t + \lambda_1 I,$$

where $\mathcal{A}_t = M_t^T W M_t$ and $$\mathcal{B} = \sum_t \mathcal{B}_t,$$

where $\mathcal{B}_t = M_t^T W(X_t - P_t \bar{s})$.

To minimize total energy with respect to $\beta_t$, some embodiments set the gradient of E to $\beta_t$ to be zero, such that $$0 = \frac{\partial E}{\partial \beta_t} = M_t^T W(P_t \bar{s} + M_t \beta_t - X_t) + \lambda_2 \beta_t + \\ \lambda_3(-\beta_{t-1} + 2\beta_t - \beta_{t+1}) + \lambda_4(\beta_{t-2} - 4\beta_{t-1} + 6\beta_t - 4\beta_{t+1} + \beta_{t+2}),$$

in which $M_t = P_t V \otimes \gamma$. Some embodiments are based on a solution to the above equation such that $\beta_t = \mathcal{A}^{-1} \mathcal{B}$, in which $\mathcal{A} = \text{diag}(\mathcal{A}_t) + \lambda_2 I + \lambda_2 \mathcal{H}_1 + \lambda_4 \mathcal{H}_2$, where $\mathcal{A}_t = M_t^T W M_t$ and $$\mathcal{B} = \begin{bmatrix} \mathcal{B}_{12} \\ \mathcal{B}_T \end{bmatrix},$$

where $\mathcal{B}_t = M_t^T W(X_t - P_t \bar{s})$. The matrices $\mathcal{H}_1$ and $\mathcal{H}_2$ are defined as $$\mathcal{H}_1 = \begin{pmatrix} 1 & -1 & & & \\ -1 & 2 & -1 & & \\ & & \ldots & & \\ & & -1 & 2 & -1 \\ & & & -1 & 1 \end{pmatrix} \odot I$$

$$\mathcal{H}_2 = \begin{pmatrix} 1 & -2 & 1 & & & & \\ -2 & 5 & -4 & 1 & & & \\ 1 & -4 & 6 & -4 & 1 & & \\ & & & \ldots & & & \\ & & 1 & -4 & 6 & -4 & 1 \\ & & & 1 & -4 & 5 & -2 \\ & & & & 1 & -2 & 1 \end{pmatrix} \odot I,$$

where $\odot$ is the Kronecker product.

Figure 5:
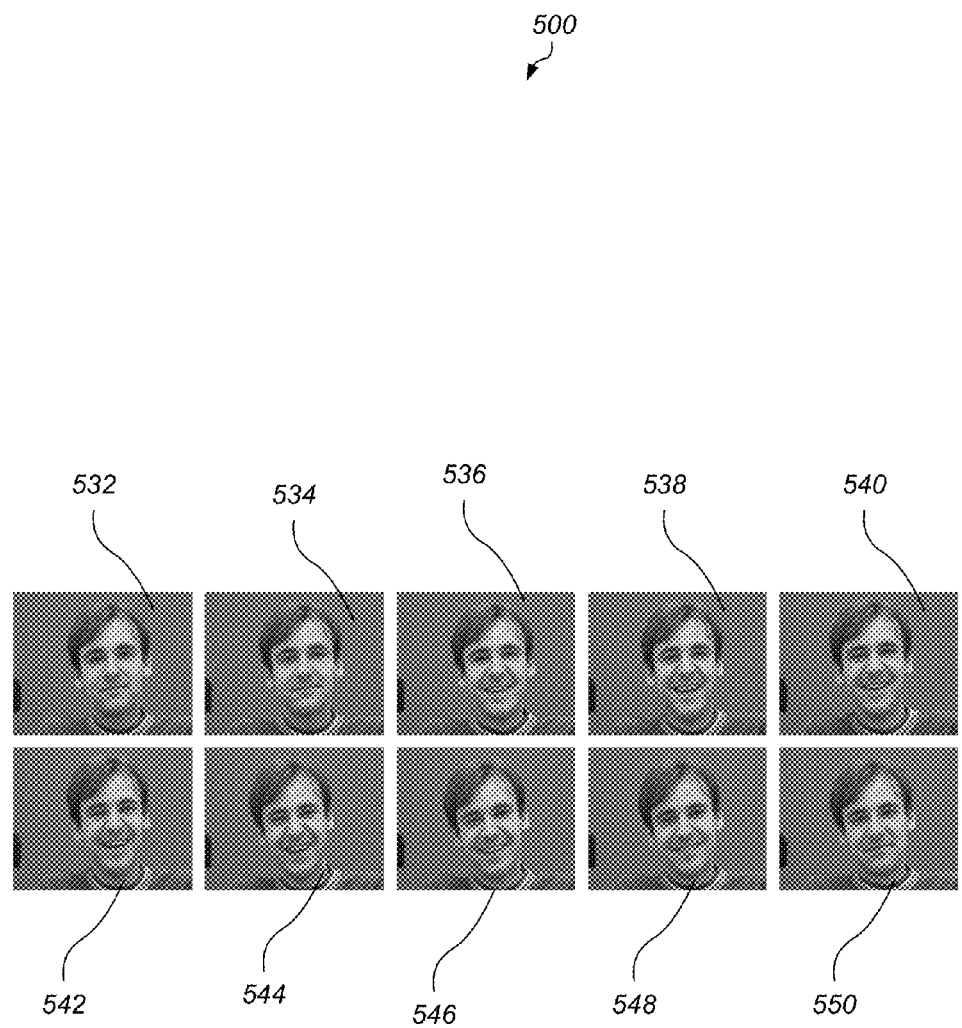
FIG. 5 depicts a set of input frames for use in face fitting and editing applications according to some embodiments.
Figure 6:
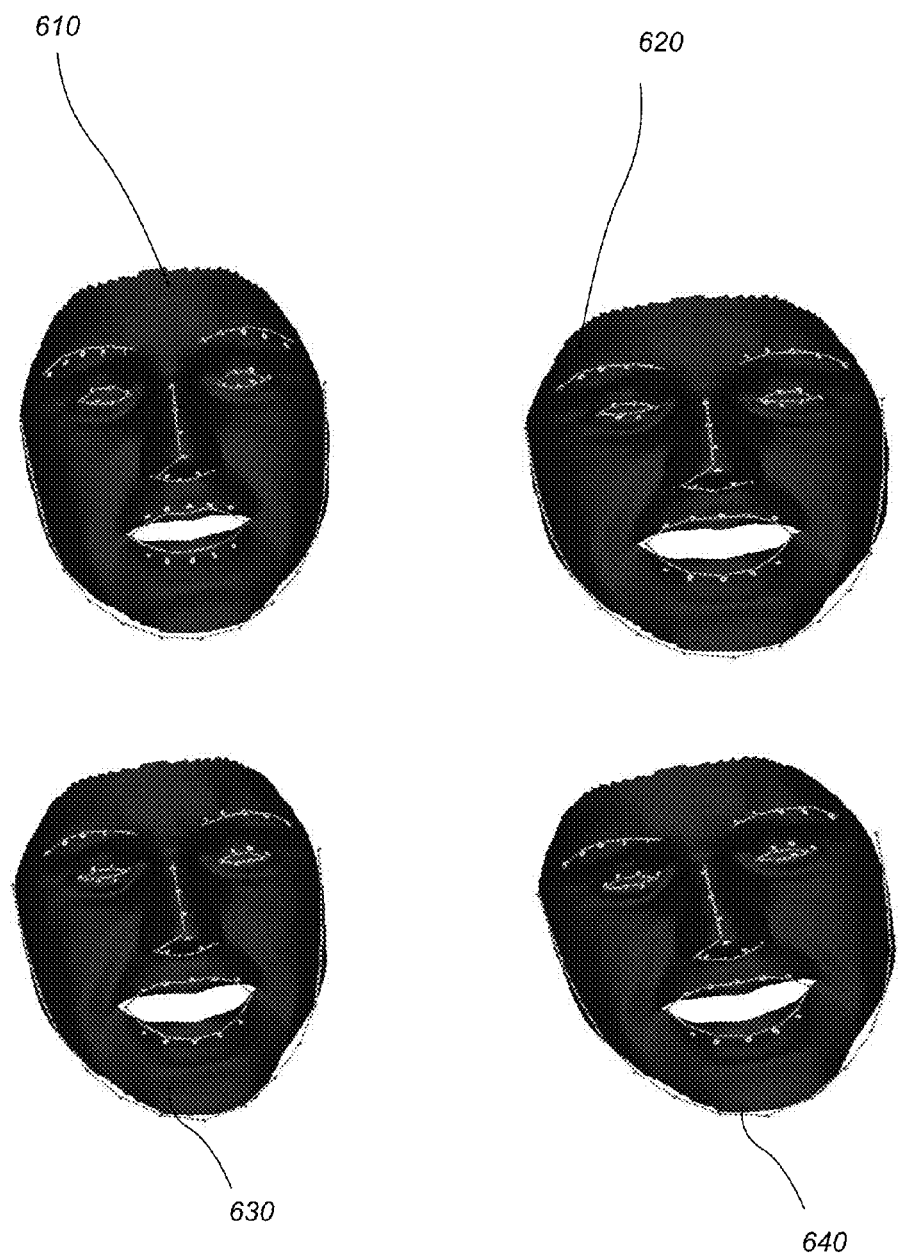
FIG. 6 illustrates model fitting for use in face fitting and editing applications according to some embodiments.

Some embodiments have been evaluated using an image sequence consisting of 51 frames, in which a subject changes expression from neutral to smile, and then back to neutral. FIG. 5 shows 10 frames from the sequence, as described in more detail below. Embodiments have been used to fit the whole sequence. Example fitted three-dimensional models are shown in FIG. 6. Results reveal that some embodiments accurately fit two-dimensional features across expression and pose change.

Figure 7:
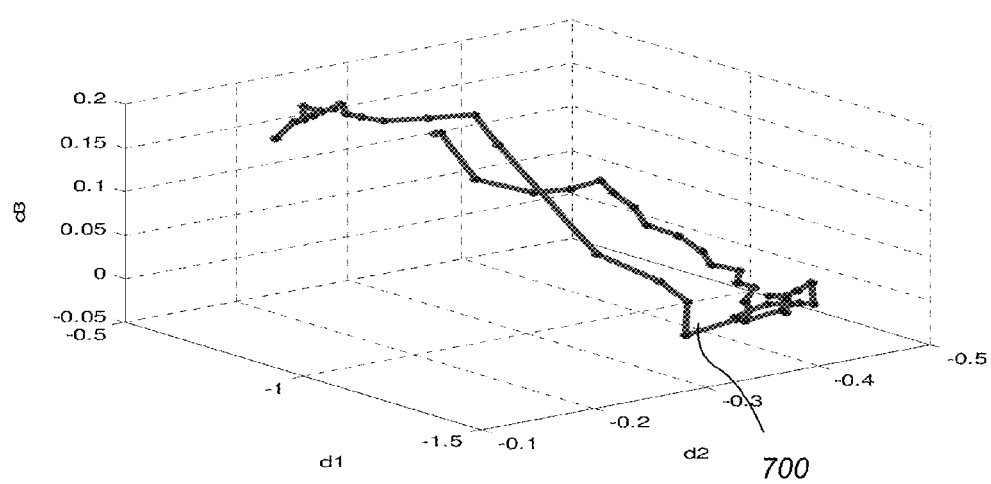
FIG. 7 depicts trace expression coefficients for use in face fitting and editing applications according to some embodiments.

Some embodiments reduce the dimension of expression coefficients $\beta_t$ to be 3, and plot it in a three-dimensional space, as shown in FIG. 7, which shows the trace of $\beta_t$, when the expression changes from neutral to smile, and back to neutral, as described in more detail below. Trace of expression coefficients $\beta_t$ demonstrate that embodiments fit the face model to the whole sequence, and draw expression coefficients $\beta_t$ in three-dimensional space.

Some embodiments have been tested to demonstrate the effect of the weights of energy terms. Some embodiments run 5 iterations for energy minimization, and in each iteration, use 3 steps to optimize $R_t$, $\beta_t$ and $\gamma$ respectively. In such embodiments, there are a total of 15 steps, and the energy after each step in plotted in FIGS. 8A-8C. The dimensions of vertices, expressions and identities are 40, 10 and 16 respectively in all the three of FIGS. 8A-8C, which are described below.

Figure 8A:
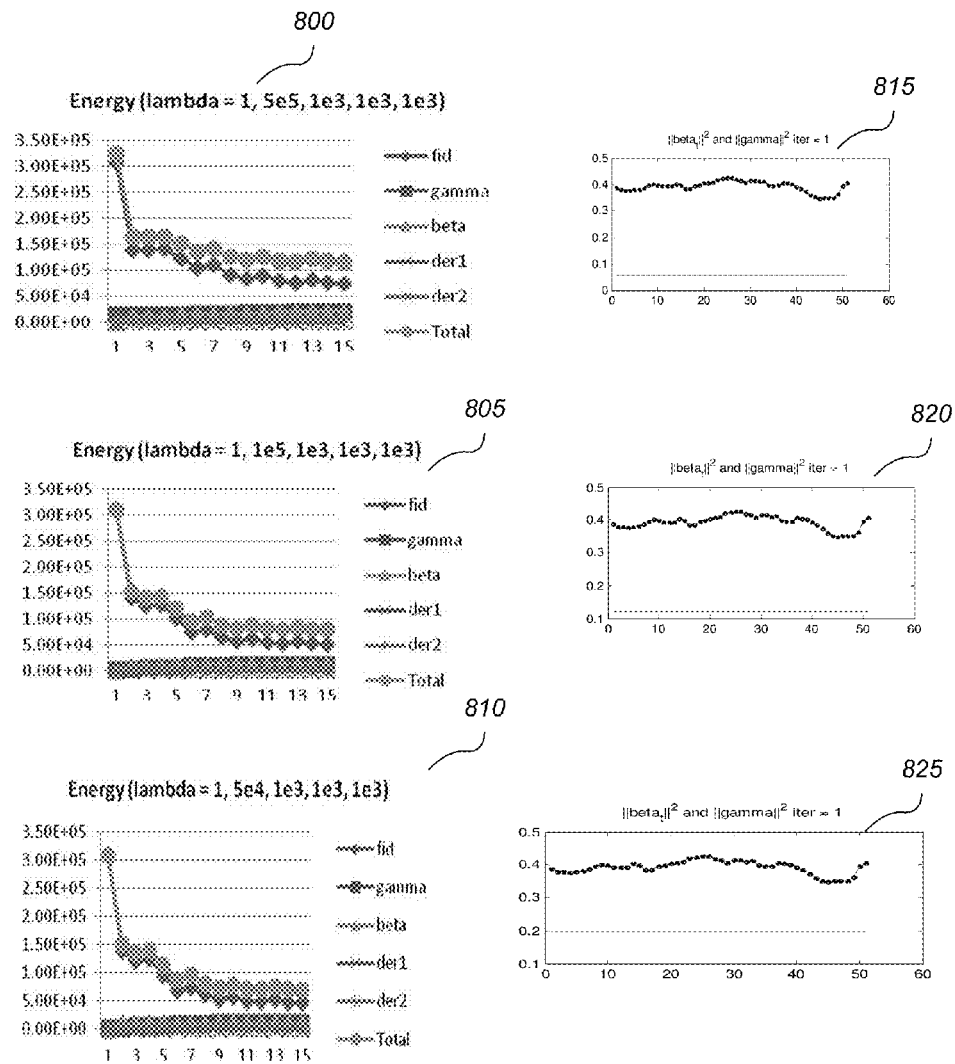
FIG. 8A illustrates a series of experiments depicting the impact of various settings of $\lambda_1$ on energy values according to some embodiments.
Figure 8B:
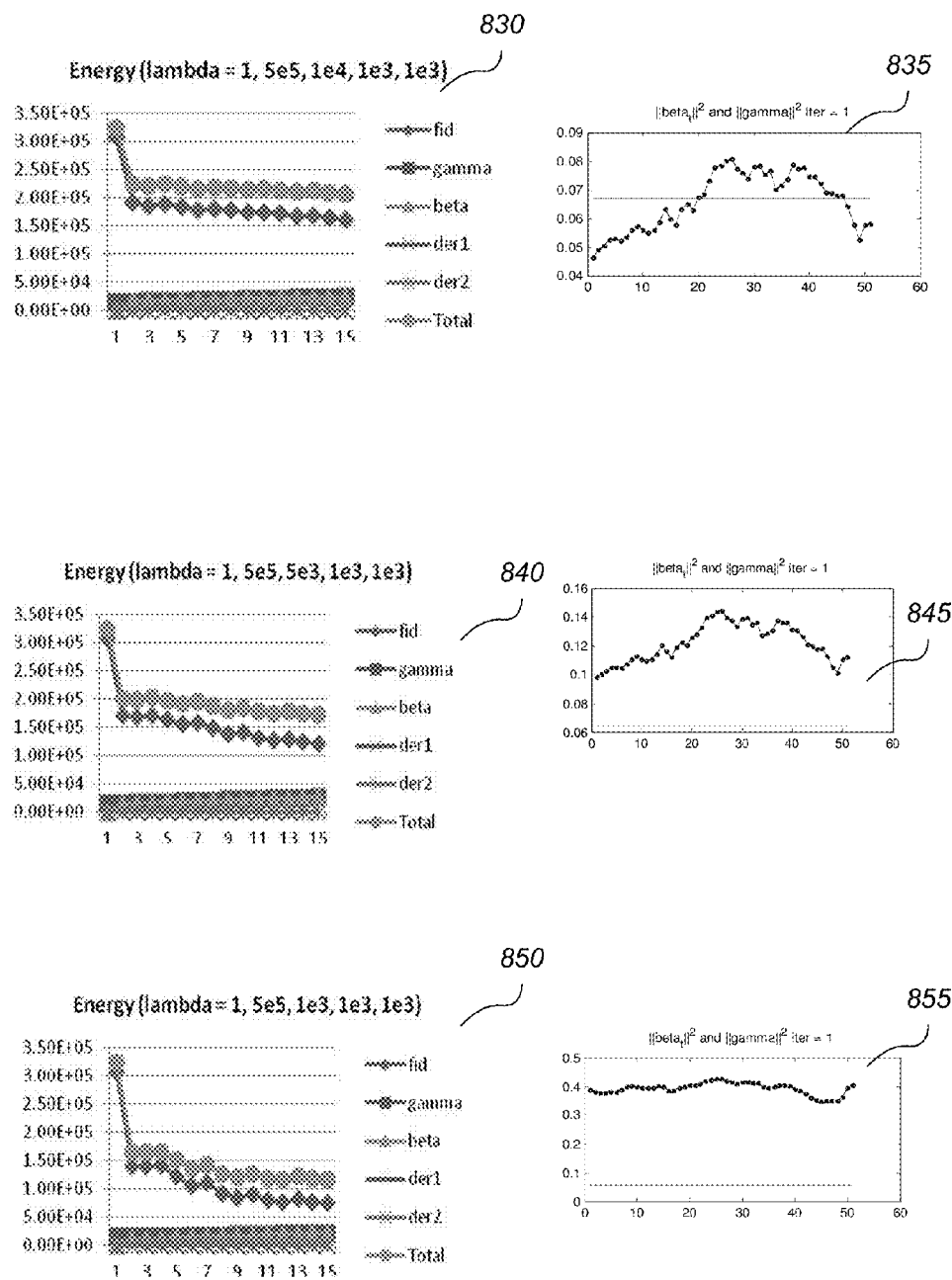
FIG. 8B depicts a series of experiments depicting the impact of various settings of $\lambda_2$ on energy values according to some embodiments.
Figure 8C:
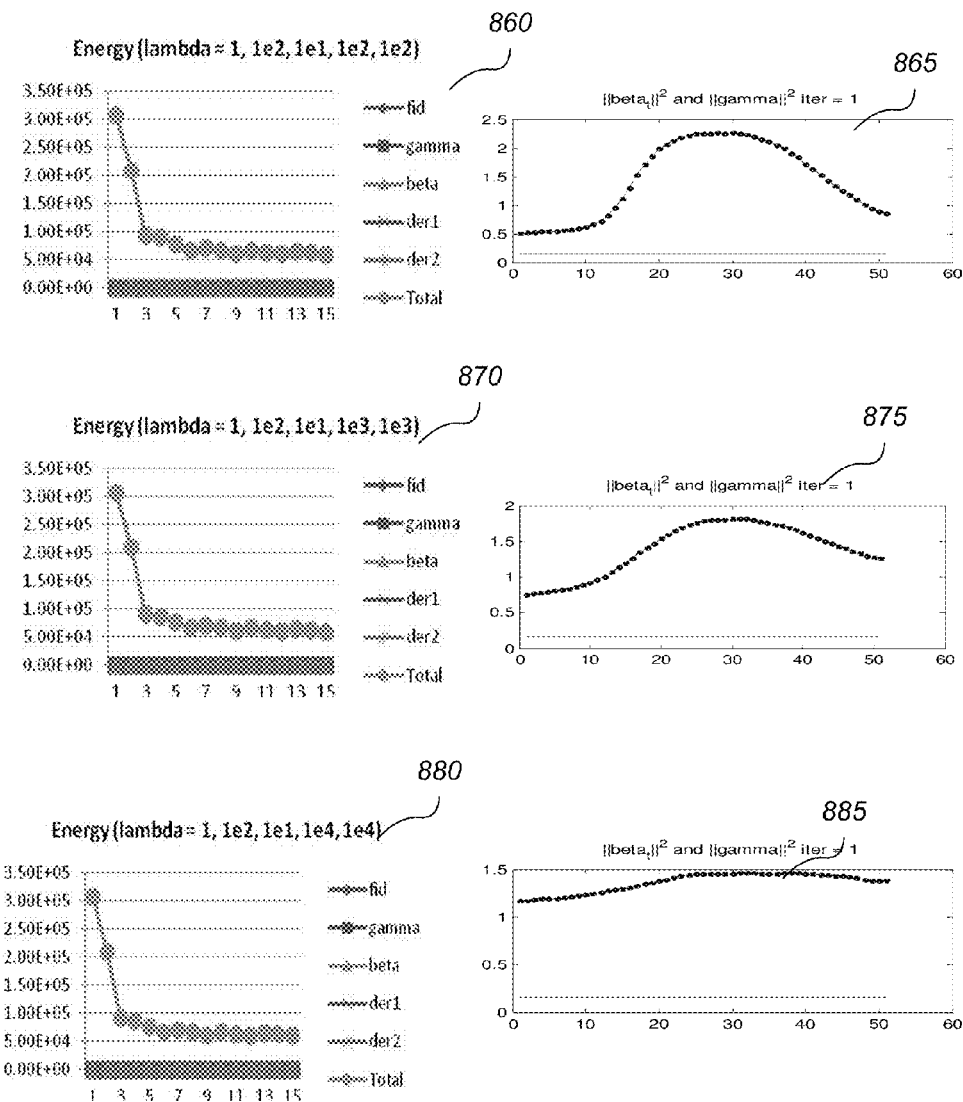
FIG. 8C illustrates a series of experiments depicting the impact of various settings of $\lambda_3$ and $\lambda_4$ on energy values according to some embodiments.

To find the effect of $\lambda_1$, some embodiments were used with fixed $\lambda_2$, $\lambda_3$ and $\lambda_4$ at 1e3, 1e3 and 1e3. These values were then changed such that $\lambda_1$ was set to be 5e5, 1e5 and 5e4. As shown in FIG. 8A, and described in detail below, when $\lambda_1$ decreases, the magnitude of $\gamma$ increases, and the fidelity term decreases. To find the effect of $\lambda_2$, embodiments were used with fixed $\lambda_1$, $\lambda_2$ and $\lambda_4$ to be 5e5, 1e3 and 1e3. These values were then changed such that $\lambda_2$ is set to be 1e4, 5e3 and 1e3. As shown in FIG. 8B, and described in detail below, when $\lambda_2$ decreases, the magnitude of $\beta_t$ increases, and the fidelity term decreases. To test the effect of $\lambda_2$ and $\lambda_4$, embodiments were used with fixed $\lambda_2$ and $\lambda_2$ to be 1e2 and 1e1. For simplicity, the same values were set to $\lambda_3$ and $\lambda_4$. These values were then changed to be 1e2, 1e3 and 1e3, respectively. As shown in FIG. 8C, and described in detail below, when $\lambda_3$ and $\lambda_4$ increases, $\beta_t$ becomes smoother, but the fidelity term does not have significant change.

In FIG. 8A, and described in detail below, energy is plotted vs. different values of $\lambda_1$. The parameter $\lambda_1$ is set to be 5e5, 1e5 and 5e4 from top to bottom, while other parameters are fixed. The subspace dimensions for vertices, expressions and identities are 40, 10 and 16 respectively. As $\lambda_1$ decreases, the magnitude of $\gamma$ increases, and the fidelity term decreases. In FIG. 8B, and described in detail below, energy is plotted vs. different values of $\lambda_2$. The parameter $\lambda_2$ is set to be 1e4, 5e3 and 1e3 from top to bottom, while other parameters are fixed. The dimensions for vertices, expressions and identities are 40, 10 and 16 respectively. As $\lambda_2$ decreases, the magnitude of $\beta_t$ increases, and the fidelity term decreases. In FIG. 8C, and described in detail below, energy is plotted vs. different values of $\lambda_3$ and $\lambda_4$. The parameters $\lambda_3$ and $\lambda_4$ are set to be 1e2, 1e3 and 1e3 from top to bottom, while other parameters are fixed. As $\lambda_3$ and $\lambda_4$ increases, $\beta_t$ becomes smoother, but fidelity term does not have significant change.

Among the many applications of embodiments, an example is illustrated with respect to hole-filling. Joint fitting embodiments have many applications for face editing and expression transfer. One of the applications is hole-filling. Given an image sequence with missing frames, embodiments recover the face geometry in the missing frames. Assuming the frames from t1 to t2 are missing, the two-dimensional face features are unavailable in these frames, and no error terms can be calculated in these frames. Therefore, embodiments set $\mathcal{A}_t$ and $\mathcal{B}_t$ to be zero for t from t1 to t2 when solving $\beta_t$ and $\gamma$. Note that the linear equation system is over constrained, and embodiments still have enough constraints to solve $\beta_t$ and $\gamma$, even when some frames are missing.

Figure 9A:
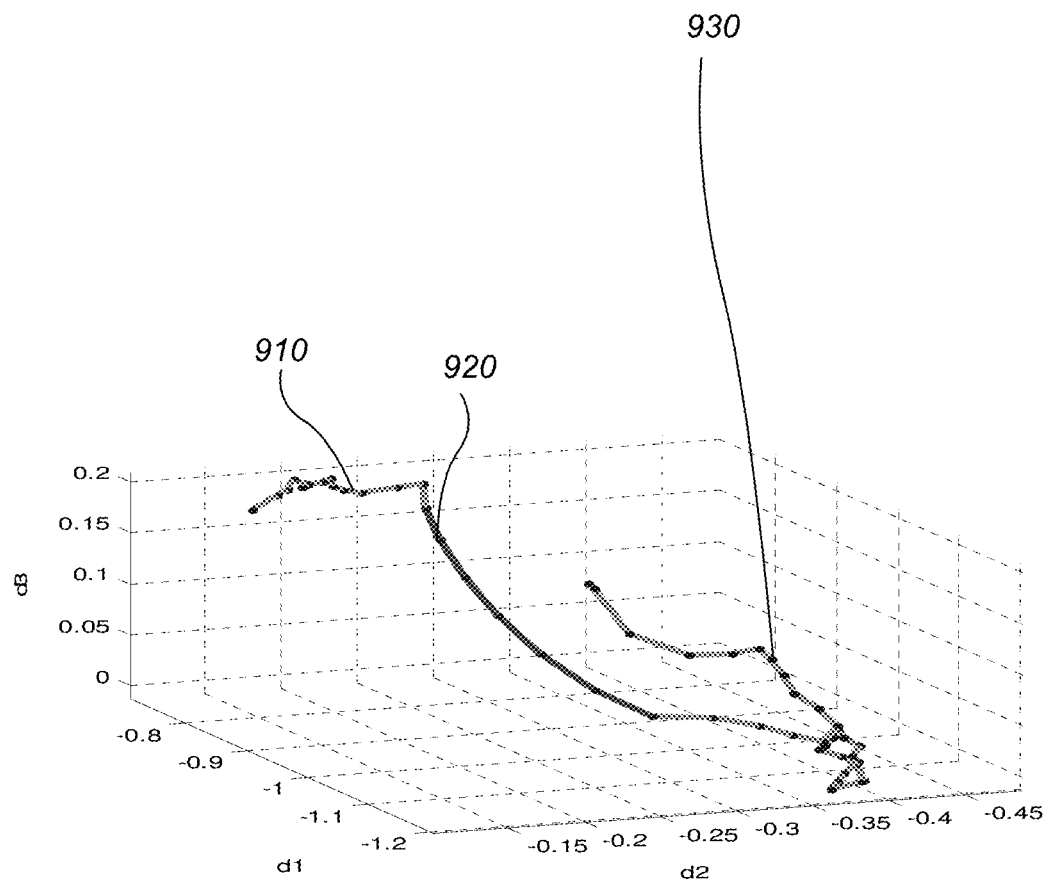
FIG. 9A depicts a series of experiments depicting recovered coefficients $\beta\tau$ in a hole filling application according to some embodiments.

FIG. 9A shows the recovered coefficients $\beta_t$ in hole-filling, as described in detail below. In this experiment, 5 frames (15~19) are removed from the input sequence.

Figure 9B:
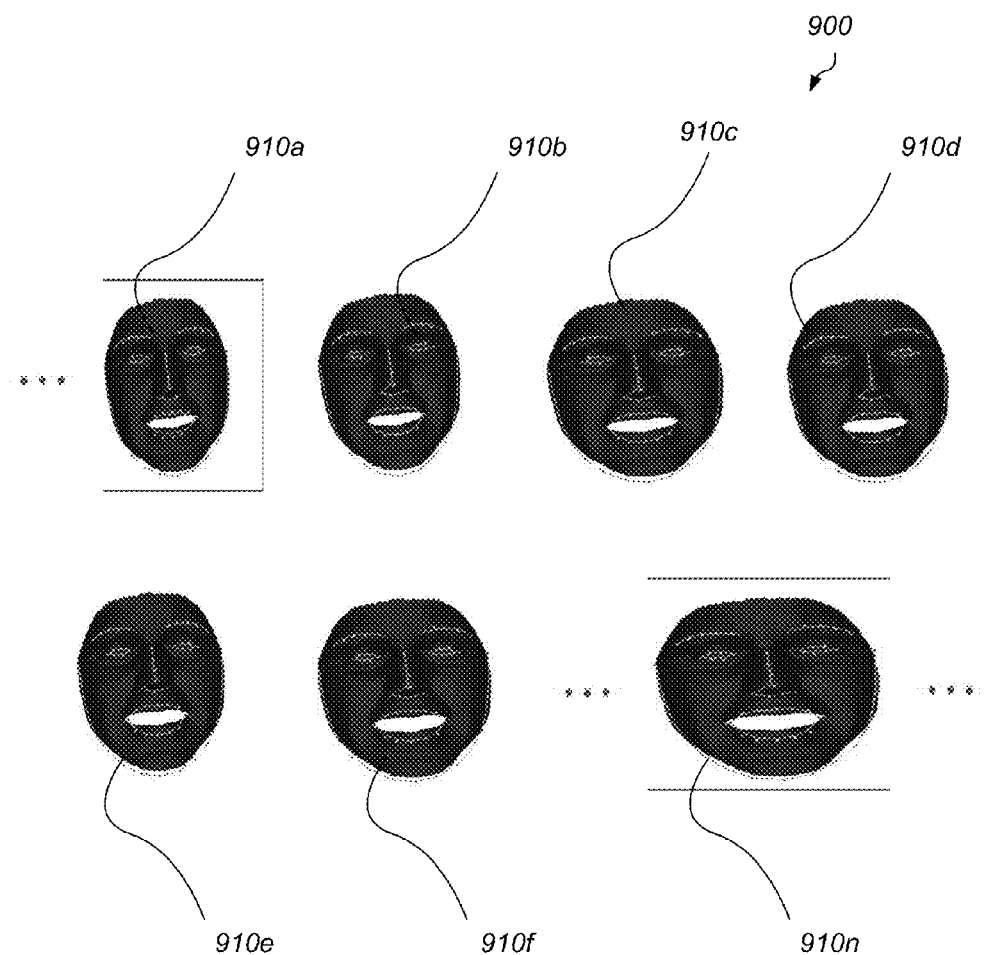
FIG. 9B illustrates an example of face models in hole filling according to some embodiments.

FIG. 9B shows the recovered face geometry, as described in detail below.

Embodiments jointly fit three-dimensional face models to an image sequence and model the face geometry using a 3-mode tensor model, which deforms in a low-dimension tensor space. Under the constraints that all images have the same person, and the face expressions must change smoothly, embodiments jointly fit all frames at the same time. Embodiments use a joint fitting approach to fit an image sequence that decouples the face shape from its expression and identity. Embodiments define face fitting as an energy minimization problem, and employ an iterative algorithm to solve it, which, in some embodiments gradually reduces the total energy and converges quickly. Some embodiments provide a solution to the hole-filing problem, and some embodiments successfully recover the face shape in the missing frames.

Additional applications performed by some embodiments include expression magnification and neutralization. After fitting three-dimensional models to face images, and recovering coefficients for identity and expression, some embodiments scale expression coefficients by a specified factor, resulting in three-dimensional face shapes with magnified or neutralized expressions. Such embodiments project the three-dimensional shapes to the image plane, and compute the movement of the projections to generate expression flow. The expression flow is a two-dimensional flow field, which can be used to warp the face image to change expression.

Additional applications performed by some embodiments include expression transfer. Recovered three-dimensional shapes can be used to transfer an expression from another part of the same video, from another video of the same subject, or even from another video of a different subject. For a target sequence A in which a user wants to replace an expression, and a reference sequence B with the desired expression, some embodiments fit three-dimensional face models and recover the coefficients of identity and expression, denoted as $\gamma^{(A)}$, $\gamma^{(B)}$, $\beta_t^{(A)}$ and $\beta_t^{(B)}$. The identity coefficients $\gamma^{(A)}$ and $\gamma^{(B)}$ can either be the same if the two sequences are of the same person, or different if they are of different identities. Such embodiments can replace the expression coefficients $\beta_t^{(A)}$ by $\beta_t^{(B)}$, and reconstruct three-dimensional shapes using $\gamma^{(A)}$ and $\beta_t^{(B)}$. Such embodiments project the three-dimensional shapes to image plane, and use the expression flow (as explained above) to warp the original sequence. Such embodiments transfer the expression from one sequence to another.

In some embodiments, recovered three-dimensional shapes can be used for a histogram-like operation, for instance, histogram equalization and gamma correction (i.e. applying a non-linear gamma function on the histogram). Such embodiments reduce the expression coefficients to low dimension, and perform operations on the histogram. Such embodiments, for example, increase the frequency of smiles vs. neutral expressions of a subject.

In some embodiments, face fitting is be used for video compression. Given a video of a person's face, such embodiments extract three-dimensional shapes in each frame. The shapes are controlled by only a few parameters including scale, rotation angles, position, expression coefficients and identity coefficients. Such embodiments store the parameters and a few key frames containing the face appearance, which are sufficient to recover the original video. Experiments performed on such embodiments, which only perform local linear interpolation, achieve higher SNR (Signal-to-Noise-Ratio) than current state-of-the-art video codec H.264.

Some embodiments support three-dimensional avatar control. Some embodiments track the three-dimensional face shapes in video and are used to create a three-dimensional avatars driven by the face captured from a single camera.

Example Implementations

Figure 10:
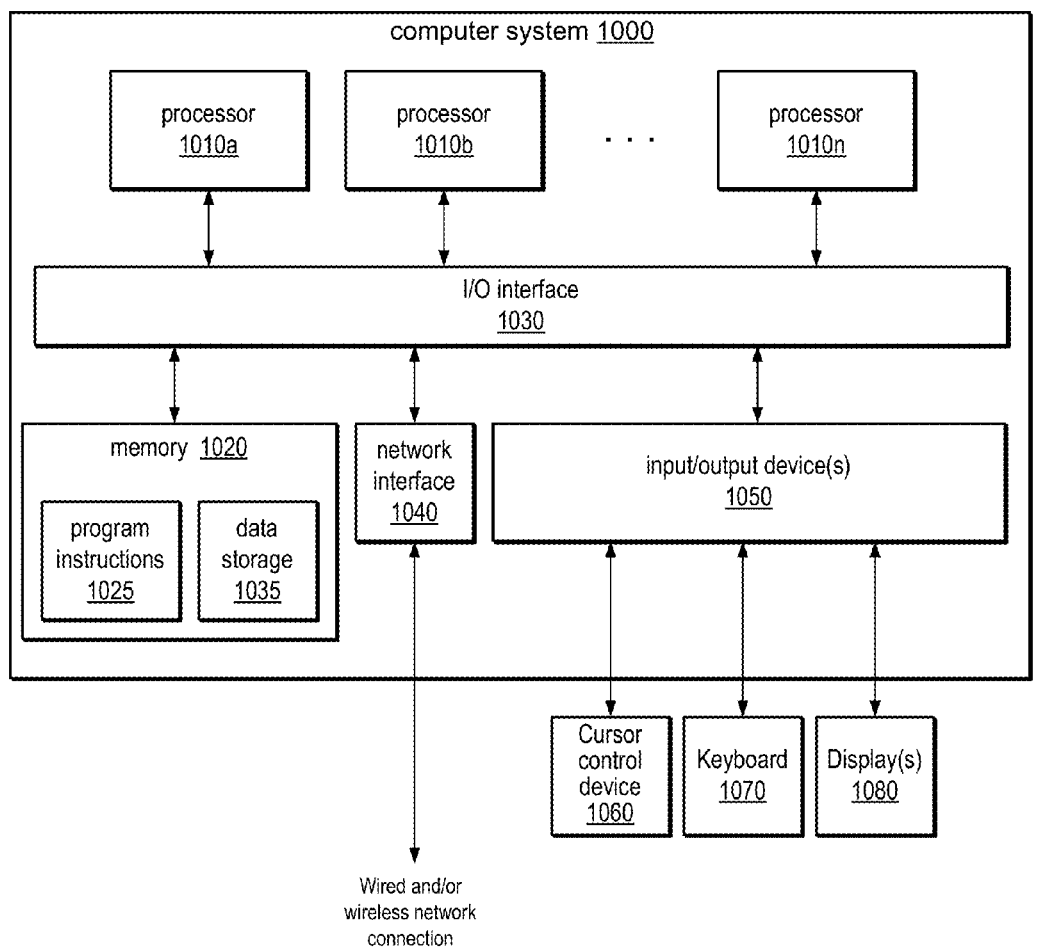
FIG. 10 illustrates an example computer system that may be used in embodiments.

FIG. 1 illustrates a module that may implement face fitting and editing applications, as described herein, according to some embodiments. A face-fitting module 120 may implement one or more of the multitouch face-fitting image editing techniques and tools described above and illustrated in FIGS. 2A through 9B. Face-fitting module 120 may, for example, implement one or more of a hole-filling tool, an expression modification tool, a histogram methods tool, a frame replacement tool or a compression tool. FIG. 10 illustrates an example computer system on which embodiments of face-fitting module 120 may be implemented.

Face-fitting module 120 receives as input a set of digital images 110. An example image is shown in FIG. 1A. Face-fitting module 120 may receive user input 112 activating one of a hole-filling tool, an expression modification tool, a histogram methods tool, a frame replacement tool or a compression tool. Face fitting module 120 then performs identifying sets of two-dimensional local feature points on a face in each image of a set of images, and generating a three-dimensional face model for the face in the each image as a combination of a set of predefined three-dimensional face models. Face-fitting module 120 then performs applications, as described above, and edits the input image(s) 110, according to user input 112 received via user interface 122, performing the selected application for the face-fitting-based image editing tool. The user may activate face-fitting-based image editing tool and further edit the images, and/or may activate other tools and further edit the images. Face-fitting module 120 generates as output one or more output images 150 and/or output parameters 130. Output image(s) 150 and output parameters 130 may, for example, be stored to a storage medium 140, such as system memory, a disk drive, DVD, CD, etc.

In some embodiments, face-fitting module 120 may provide a user interface 122 via which a user may interact with the face-fitting module 120, for example to activate a face-fitting-based tool and thereby perform a hole filling operation, an expression modification operation, a histogram methods operation, a frame replacement operation or a compression operation In some embodiments, the user interface may provide user interface elements whereby the user may select options including, but not limited to, sampling rates, adjustment parameters, or a sequence of frames on which operations are to be performed.

Figure 2A:
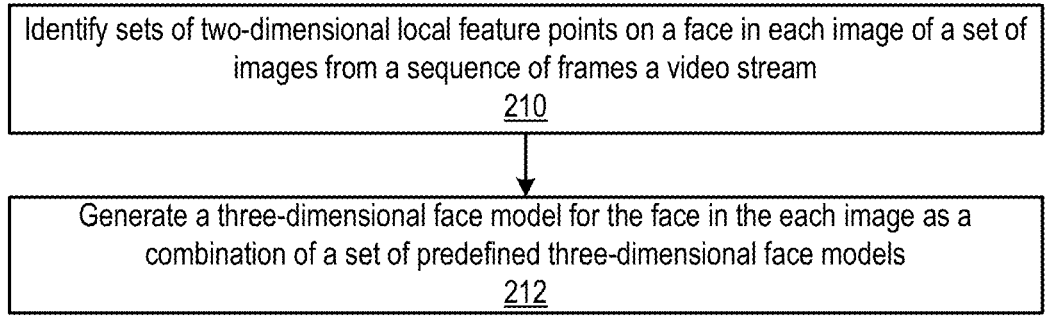
FIG. 2A is a high-level logical flowchart of operations for face fitting for use in editing applications according to some embodiments.

FIG. 2A is a high-level logical flowchart of operations for face fitting for use in editing applications according to some embodiments. Sets of two-dimensional local feature points are identified on a face in each image of a set of images from a sequence of frames a video stream (block 210). A three-dimensional face model is generated for the face in the each image as a combination of a set of predefined three-dimensional face models (block 212).

Figure 2B:
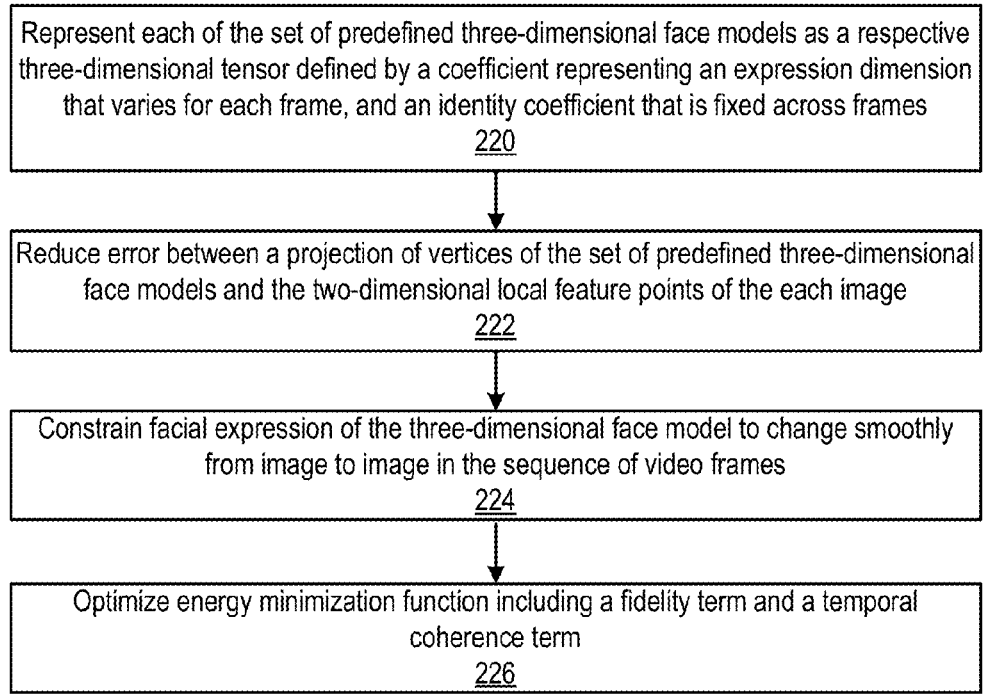
FIG. 2B is a high-level logical flowchart of operations that may be used for generating a three-dimensional face model for use in editing applications according to some embodiments.

FIG. 2B is a high-level logical flowchart of operations that may be used for generating a three-dimensional face model for use in editing applications according to some embodiments. Each of the set of predefined three-dimensional face models is represented as a respective three-dimensional tensor defined by a coefficient representing an expression dimension that varies for each frame, and an identity coefficient that is fixed across frames (block 220). Error between a projection of vertices of the set of predefined three-dimensional face models and the two-dimensional local feature points of the each image is reduced (block 222). Facial expression of the three-dimensional face model is constrained to change smoothly from image to image in the sequence of video frames (block 224). The energy minimization function is optimized, including a fidelity term and a temporal coherence term (block 226).

Figure 2C:
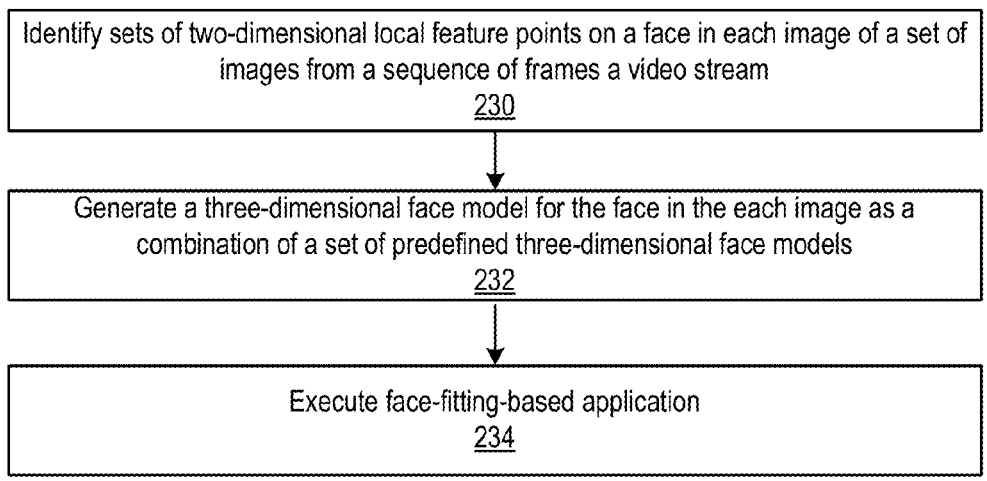
FIG. 2C is a high-level logical flowchart of operations for an application of face fitting according to some embodiments.

FIG. 2C is a high-level logical flowchart of operations for an application of face fitting according to some embodiments. Sets of two-dimensional local feature points on a face in each image of a set of images from a sequence of frames a video stream are identified (block 230). A three-dimensional face model for the face in the each image as a combination of a set of predefined three-dimensional face models is generated (block 232). A face-fitting-based application is executed (block 234).

Figure 3:
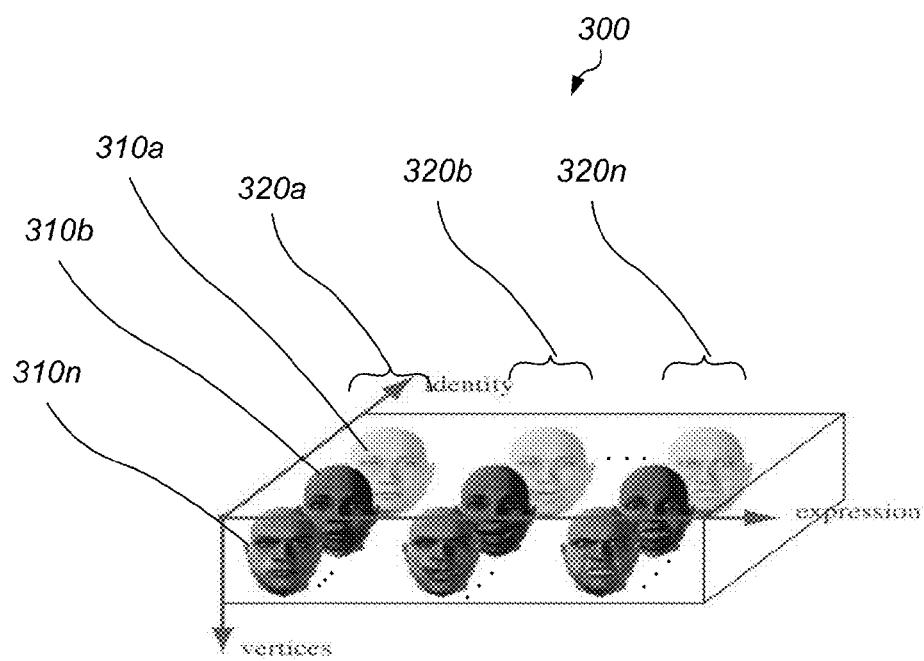
FIG. 3 depicts a tensor model of facial expression for use with some embodiments.

FIG. 3 depicts a tensor model of facial expression for use with some embodiments. In FIG. 3, a predefined face model set 300 is shown for a set of identities $310a$-$310n$ in varying expressions $320a$-$320n$.

FIG. 4 illustrates identification of feature points for use in face fitting and editing applications according to some embodiments. A set of feature points 422-450 mathematically describes the features of a face 400 in a frame 410. As shown in FIG. 4, embodiments employ a facial feature tracking system to automatically detect and track sixty-six predefined landmarks on face. Some of these landmarks are defined at specific locations (e.g. eye corner, nose-tip etc). Others are defined to interpolate the boundary of face components (e.g. mouth boundary is defined by 12 landmarks). For landmarks located inside the face, some embodiments simply hard-code the corresponding three-dimensional vertex. However, landmarks along the face contour do not have a single corresponding vertex and are matched with three-dimensional vertices along the face silhouette.

FIG. 5 depicts a set of input frames for use in face fitting and editing applications according to some embodiments. A video sequence 500 including a set of images 532-550 is presented.

FIG. 6 illustrates model fitting for use in face fitting and editing applications according to some embodiments. A set of models 610-640 is presented. Example fitted three-dimensional models are shown in FIG. 6. The four models shown are at first model 610 representing frame 534 of FIG. 5, second model 620 representing frame 538 of FIG. 5, third model 630 representing frame 544 of FIG. 5 and fourth model 640 representing frame 548 of FIG. 5.

FIG. 7 depicts trace expression coefficients for use in face fitting and editing applications according to some embodiments. FIG. 7 shows the trace of $\beta_t$ 700 when the expression changes from neutral to smile, and back to neutral.

FIG. 8A illustrates a series of experiments depicting the impact of various settings of $\lambda_1$ on energy values according to some embodiments. In FIG. 8A, energy is plotted vs. different values of $\lambda_1$. The parameter $\lambda_1$ is set to be 5e5 in first energy graph 800 and corresponding beta/gamma graph 815, 1e5 in second energy graph 805 and corresponding beta/gamma graph 820, and 5e4 in third energy graph 810 and corresponding beta/gamma graph 825, while other parameters are fixed. The subspace dimensions for vertices, expressions and identities are 40, 10 and 16 respectively. As $\lambda_1$ decreases, the magnitude of $\gamma$ increases, and the fidelity term decreases.

FIG. 8B depicts a series of experiments depicting the impact of various settings of $\lambda_2$ on energy values according to some embodiments. As shown in FIG. 8B, when $\lambda_2$ decreases, the magnitude of $\beta_t$ increases, and the fidelity term decreases. To test the effect of $\lambda_3$ and $\lambda_4$, embodiments were used with fixed $\lambda_2$ and $\lambda_2$ to be 1e2 and 1e1. For simplicity, the same values were set to $\lambda_3$ and $\lambda_4$. These values were then changed to be 1e2 first energy graph 830 and corresponding beta/gamma graph 835, 1e3 second energy graph 840 and corresponding beta/gamma graph 845 and 1e3 first energy graph 850 and corresponding beta/gamma graph 855, respectively.

FIG. 8C illustrates a series of experiments depicting the impact of various settings of $\lambda_3$ and $\lambda_4$ on energy values according to some embodiments. As shown in FIG. 8C, when $\lambda_3$ and $\lambda_4$ increases, $\beta_t$ becomes smoother, but the fidelity term does not have significant change. A first energy graph 860 and corresponding beta/gamma graph 865, second energy graph 870 and corresponding beta/gamma graph 875, and third energy graph 880 and corresponding beta/gamma graph 885 are shown.

FIG. 9A depicts a series of experiments depicting recovered coefficients $\beta\tau$ in a hole filling application according to some embodiments. FIG. 9A shows the recovered coefficients $\beta_t$ in hole-filling. In this experiment, 5 frames (15~19) are removed from the input sequence. The coefficients for the missing frames (red curve 920) are recovered using the existing frames (green curve 910 and green curve 930). The red curve is a smooth transition between the two green curves. The weights of energy terms are (1e2, 1e1, 1e3, e3). The subspace dimensions for vertices, expressions and identities are 40, 3 and 16 respectively. Coefficients is in hole-filling when 5 frames (15~19) are removed from the input sequence (red curve) are recovered using the existing frames (green curve). The red curve is a smooth transition between the two green curves. The weights of energy terms are (1e2, 1e1, 1e3, e3). The subspace dimensions for vertices, expressions and identities are 40, 3 and 16 respectively.

FIG. 9B illustrates an example of face models in hole filling according to some embodiments. FIG. 9B shows the recovered face geometry. A face model set 900 includes models 910a-910n. The face shapes generate a smooth transition from frame 14 to frame 20, showing a mouth opening procedure. Note that although the face landmarks are shown for every frame, those in frames 15~19 are not used in the fitting process. These landmarks are ground truth, and are very close to the face shape generated using some embodiments. Coefficients $\beta_t$ in hole-filling when 5 frames (15~19) are removed from the input sequence are recovered using the existing frames, and face geometries are recovered and shown. Note that although the face landmarks are shown for every frame, those in frames 15~19 are not used in the fitting process. The weights of energy terms are (1e2, 1e1, 1e3, e3). The subspace dimensions for vertices, expressions and identities are 40, 3 and 16 respectively.

Example System

FIG. 10 illustrates an example computer system that may be used in embodiments. Embodiments of a face-fitting image editing module and/or of the various face fitting image editing techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a face-fitting module are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a face-fitting module as described herein, and data storage 1035, comprising various data accessible by program instructions 1025. In one embodiment, program instructions 1025 may include software elements of embodiments of a face fitting module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a face-fitting module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:
1. A method, comprising:
  causing one or more processors to perform
  identifying sets of two-dimensional local feature points on
    a face in each image of a set of images, wherein
    the set of images comprises a sequence of frames a video
      stream; and generating a three-dimensional face model for the face in the each image as a combination of a set of predefined three-dimensional face models, wherein said generating further comprises
  reducing an error between a projection of vertices of the set of predefined three-dimensional face models and the two-dimensional local feature points of the each image,
  constraining facial expression of the three-dimensional face model to change smoothly from image to image in the sequence of video frames, and
  representing each of the set of predefined three-dimensional face models using a three-dimensional tensor decomposition defined by
    a vector of coefficients representing an expression dimension that varies for each frame, and
    a vector of identity coefficients that is fixed across frames.

2. The method of claim 1, wherein
the generating the three-dimensional face model for the face in the each image further comprises
  optimizing an energy minimization function including a fidelity term and a temporal coherence term.

3. The method of claim 1, wherein
the generating the three-dimensional face model for the face in the each image further comprises
  optimizing an energy minimization function including a temporal coherence term.

4. The method of claim 1, wherein
the generating the three-dimensional face model for the face in the each image further comprises
  optimizing an energy minimization function including a fidelity term.

5. The method of claim 1, further comprising
generating a new image representing an adjustment of a respective one or more of the combinations to adjust an expression of the face.

6. The method of claim 1, further comprising
compressing an image stream, wherein the compressing comprises
  generating a new image representing a key frame and a series of deformations representing each of the set of images.

7. The method of claim 1, further comprising
generating a new image representing an adjustment of a respective one or more of the combinations to replace a missing frame.

8. A system, comprising:
at least one processor; and
a memory comprising program instructions, wherein the program instructions are executable by the at least one processor to:
  identify sets of two-dimensional local feature points on a face in each image of a set of images, wherein the set of images comprises a sequence of frames a video stream; and
  generate a three-dimensional face model for the face in the each image as a combination of a set of predefined three-dimensional face models, wherein the program instructions executable by the at least one processor to generate the three-dimensional face model for the face in the each image further comprise program instructions executable by the at least one processor to represent each of the set of predefined three-dimensional face models using a three-dimensional tensor decomposition defined by
    a vector of coefficients representing an expression dimension that varies for each frame, and
    a vector of identity coefficients that is fixed across frames, and
  constrain facial expression of the three-dimensional face model.

9. The system of claim 8, wherein
the program instructions executable by the at least one processor to generate the three-dimensional face model for the face in the each image further comprise program instructions executable by the at least one processor to optimize an energy minimization function including a fidelity term and a temporal coherence term.

10. The system of claim 8, wherein
the program instructions executable by the at least one processor to generate the three-dimensional face model for the face in the each image further comprise program instructions executable by the at least one processor to
  reduce an error between a projection of vertices of the set of predefined three-dimensional face models and the two-dimensional local feature points of the each image.

11. The system of claim 10, wherein
the program instructions executable by the at least one processor to constrain facial expression of the three-dimensional face model further comprise the program instructions executable by the at least one processor to constrain facial expression of the three-dimensional face model change smoothly from image to image in the sequence of video frames.

12. The system of claim 8, further comprising
program instructions executable by the at least one processor to generate a new image representing an adjustment of a respective one or more of the deformations to adjust an expression of the face.

13. The system of claim 8, further comprising
program instructions executable by the at least one processor to compress an image stream, wherein the program instructions executable by the at least one processor to compress the image stream comprise program instructions executable by the at least one processor to generate a new image representing a key frame and a series of deformations representing each of the set of images.

14. The system of claim 8, further comprising
program instructions executable by the at least one processor to generate a new image representing an adjustment of a respective one or more of the combinations to replace a missing frame.

15. A non-transitory computer-readable storage medium storing program instructions, wherein the program instructions are computer-executable to implement:
  identifying sets of two-dimensional local feature points on a face in each image of a set of images, wherein the set of images comprises a sequence of frames a video stream; and
  generating a three-dimensional face model for the face in the each image as a combination of a set of predefined three-dimensional face models, wherein the program instructions computer-executable to implement said generating further comprise program instructions computer-executable to implement
    reducing an error between a projection of vertices of the set of predefined three-dimensional face models and the two-dimensional local feature points of the each image, representing each of the set of predefined three-dimensional face models using a three-dimensional tensor decomposition defined by
- a vector of coefficients representing an expression dimension that varies for each frame, and
- a vector of identity coefficients that is fixed across frames.

16. The non-transitory computer-readable storage medium of claim 15, wherein
the program instructions computer-executable to implement generating the three-dimensional face model for the face in the each image further comprise program instructions computer-executable to implement optimizing an energy minimization function including a fidelity term and a temporal coherence term.

17. The non-transitory computer-readable storage medium of claim 15, wherein
the program instructions computer-executable to implement generating the three-dimensional face model for the face in the each image further comprise program instructions computer-executable to implement optimizing an energy minimization function including a temporal coherence term.

18. The non-transitory computer-readable storage medium of claim 17, further comprising
program instructions computer-executable to implement constraining facial expression of the three-dimensional face model to change smoothly from image to image in the sequence of video frames.

19. The non-transitory computer-readable storage medium of claim 15, further comprising
program instructions computer-executable to implement generating a new image representing an adjustment of a respective one or more of the deformations to adjust an expression of the face.

20. The non-transitory computer-readable storage medium of claim 15, further comprising
program instructions computer-executable to implement compressing an image stream, wherein the program instructions computer-executable to implement compressing the image stream comprise the program instructions computer-executable to implement generating a new image representing a key frame and a series of deformations representing each of the set of images.

* * * * *